United States Patent [19]

Huebner

[11] 3,844,753

[45] Oct. 29, 1974

[54] GLASS MOLD WITH METALLIC COOLING STUDS

[75] Inventor: Robert J. Huebner, Toledo, Ohio

[73] Assignee: Owens-Illinois, Inc., Toledo, Ohio

[22] Filed: Feb. 14, 1973

[21] Appl. No.: 332,464

[52] U.S. Cl.............................. 65/17, 65/355, 65/356, 65/375, 165/85, 249/79
[51] Int. Cl. ............................. C03b 5/00, C03b 9/38
[58] Field of Search ....... 65/356, 355, 161, 17, 375, 65/356, 355; 165/85; 249/79

[56] References Cited
UNITED STATES PATENTS 3,140,166   7/1964   Litalieh et al.......................... 65/356

*Primary Examiner*—S. Leon Bashore
*Assistant Examiner*—Frank W. Miga
*Attorney, Agent, or Firm*—Harold F. Mensing; Edward J. Holler

[57] ABSTRACT

A glass mold having a plurality of cooling studs with one of their ends protruding from the outer surface of the mold and the other of their ends inserted and tightly contained in the mold body. The studs are made of hard drawn copper rod sections having only their insertable ends softened. The diameter of the softened end of the stud is such that it may be inserted manually into a stud receiving hole in the mold and subsequently expanded in the hole by hammering on the protruding end of the stud.

5 Claims, 6 Drawing Figures

GLASS MOLD WITH METALLIC COOLING STUDS

BACKGROUND OF THE INVENTION

1. Field of the Invention

This invention relates to a glass mold having copper studs inserted into the mold body for the purpose of transferring heat away from the interior section of the mold adjacent the mold cavity.

2. Background of the Invention

It is well known that the cooling of glass molds, more particularly "hot spots" in glass molds, has been enhanced by producing holes in selected portions of the mold body and inserting protruding copper studs in these holes. However, up to the present time there has been a continuing problem because a significant percentage of such studs become loosened in the holes and eventually fall out after repeated heating and cooling of the molds such as occurs during operation and between usages. The primary cause of the problem is the differential between the coefficients of expansion of the metal mold alloy and the copper stud. Normally, the stud receiving holes in the molds were sized to provide an interference or press fit with the studs. Frequently, due to manufacturing tolerances, the fit between a stud and its hole was either too tight or too loose. In instances where the interference between the stud and hole was too great, it was difficult to tell precisely when or if the stud had bottomed in the hole, particularly if the amount of the pressing force applied to the stud was used as the primary indicator of the bottoming of the stud. Inadequately seated studs resulted in poor heat transfer between the tip of the stud and the bottom of the hole. In instances where there was only slight interference between a stud and hole, the stud became dislodged easily. In either adverse case the production efficiency of the molding machine involved was impaired or defective glassware was produced.

SUMMARY OF THE INVENTION

Generally speaking, this invention comprises a metallic mold for forming molten glass into finished glass articles. A plurality of metallic studs, such as copper studs, having a higher coefficient of heat transfer than the mold metal are installed in holes bored into the body of the mold adjacent potential "hot spots" in the mold. The studs are specially heat treated prior to installation by annealing the insertable end of the stud while leaving the other end of the stud in a hard tempered state. The studs and stud holes are sized to provide a slip fit therebetween so that the studs may be manually inserted and bottomed in the holes. Thereafter the softened insertable ends of the studs are expanded laterally into tight engagement with the walls of the bored holes by means of hammer blows applied to the protruding hardened ends of the studs. Accordingly, an important advantage of this invention lies in the capability of being able to readily custom fit the insertable end of each stud precisely to the shape and size of its respective stud retaining hole by simply hammering on the outer end of the stud. Custom fitting provides the best possible interfacial contact between each stud and its respective hole and thus provides the best possible heat transfer therebetween.

These advantages and other advantages will become more apparent as the detailed description of the invention is read with reference to the accompanying drawings.

DETAILED DESCRIPTION OF A PREFERRED EMBODIMENT OF THE INVENTION

Figure 1:
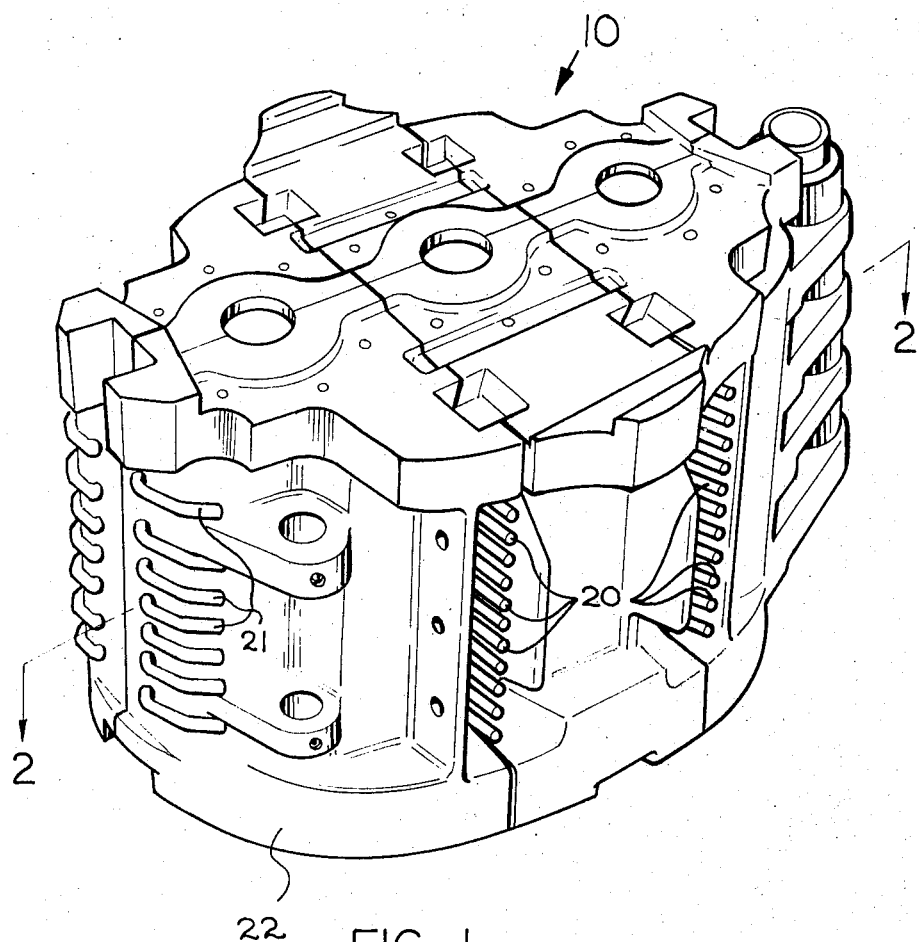
FIG. 1 is a perspective view of a triple cavity glass mold having a series of cooling studs located in the mold body between the cavities.
Figure 2:
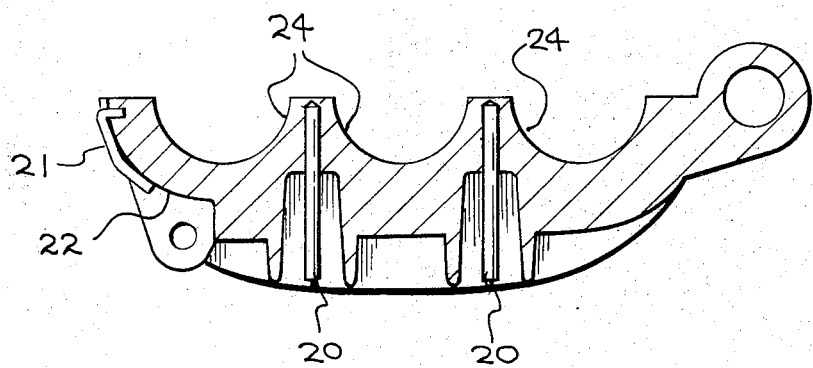
FIG. 2 is a sectional view taken along line 2—2 of FIG. 1 showing one-half of the split mold and the inserted ends of the studs.

With particular reference to FIGS. 1 and 2, there is shown a triple cavity glass forming mold 10 having a plurality of cooling studs 20 and 21 inserted in drilled holes in the body mold at selected locations. In the particular arrangement, as shown on the drawings, there are a plurality of studs in vertical alignment with their heat-receiving ends extending into the mold wall in the area adjacent to the cavities. The particular mold shown is a split or partible mold normally formed of a cast iron which, in the glass forming art, is found to be the most suitable material for a forming mold. Automatic glass forming machines of the plural cavity type frequently run hotter in the area between the cavities, inasmuch as the mold material serves as a heat sink for extracting heat from the hot glass that is expanded or formed therein and contacts the interior surface of the mold wall. The zone between cavities is hotter because it receives heat from the hot glass in both cavities and is of a relatively narrow mass with limited radiating surface. The ability of this narrow section to convey heat away from the forming surface is not as great as the ability of the mold to conduct heat away from the side wall portion of the glass. Furthermore, cooling air, which is normally used to contact the external surface of the mold and carries the heat away from the mold, is most widely used on sidewall zones of the mold and is not generally capable of withdrawing heat along the mold seam or the parting line of the mold halves. With this in mind, the studs 21 are placed adjacent the forward mold parting line because of the tendency for the molds to run hot in this region.

The overheated sections termed hot spots create a situation where the setting up of the glass is not uniform. In particular, in the blow mold, it is important that the mold extract heat from the blown bottle in as uniform a manner as possible around the diameter of the bottle, as well as throughout the height of the bottle. It must be kept in mind that before the bottle can be removed from the mold, it must be in a self-supporting condition so that it may be handled to and through an annealing lehr without deforming the bottle or without the bottle slumping from insufficiently set up glass surfaces.

Figure 4:
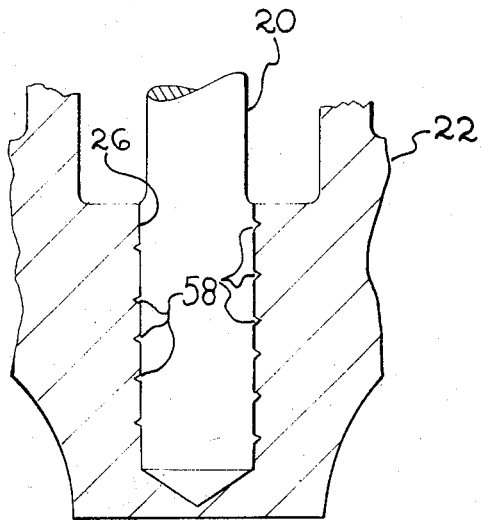
FIG. 4 is a greatly enlarged portion of the glass mold of FIG. 2 showing the insertable end of a cooling stud expanded laterally into conforming engagement with circumferentially extending tool marks of the bored hole in the mold body.
Figure 5:
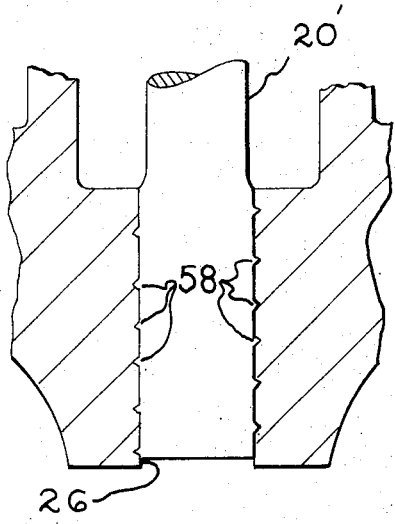
FIG. 5 is similar to FIG. 4 but of a mold section wherein the bored hole extends entirely through the mold section.
Figure 3:
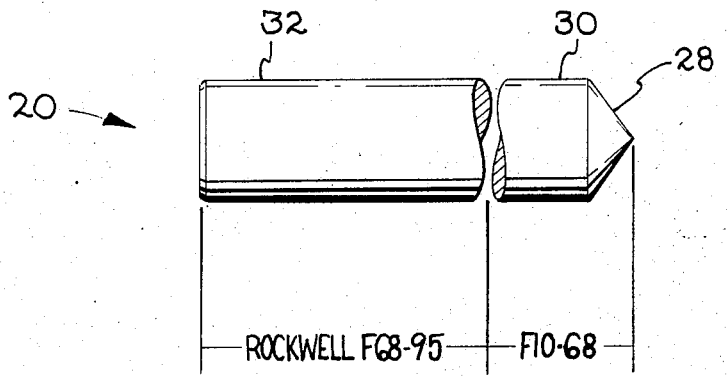
FIG. 3 is a greatly enlarged view of one of the copper cooling studs shown in FIG. 2.
Figure 6:
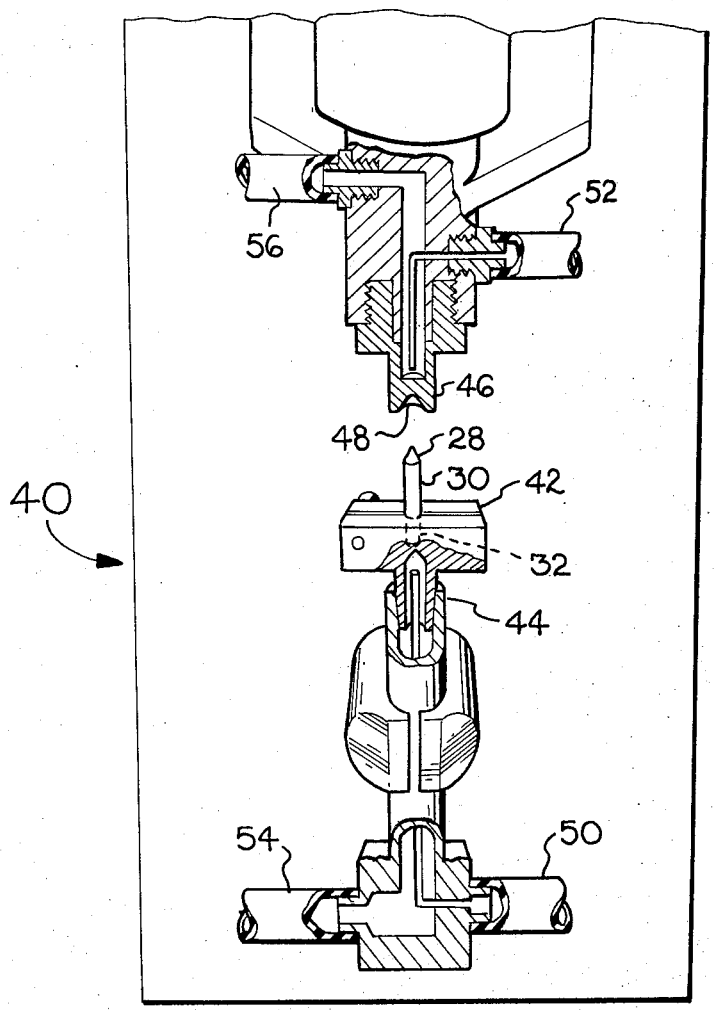
FIG. 6 is a drawing of an electrical resistance type device for annealing only the insertable end of a stud with parts of the device broken away.

With the foregoing in mind, it can clearly be seen that the production speeds and capabilities of a glass forming machine are to a certain extent dependent upon the ability to uniformly cool the glass article being produced. Some zones in a forming mold inherently are capable of withdrawing heat at a greater rate than other zones. It is these other zones which lend themselves to being provided with studs having a higher thermal transfer coefficient than molds. The studs are inserted in holes which are rough drilled from the outside of the mold body to a depth that is less than the thickness of the mold at that point, as shown best in FIG. 4, or may be completely drilled through the wall of the mold, as shown in FIG. 5, keeping in mind that the situation where the hole is drilled all the way through the mold, that the inner opening would have to be in a zone other than a forming surface. The circumferentially disposed tool marks produced in the wall surfaces of the hole by drilling help to retain an installed stud in the hole in a manner to be described later.

The studs are initially in the form of solid cylinders of uniform diameter having a length which greatly exceeds the depth of the corresponding stud hole in the mold so as to leave a substantial portion of the stud protruding beyond the immediately adjacent outer surface of the mold after the stud has bottomed in the hole. Each stud 20 may have a conically tapered tip 28 on its insertable end 30 that corresponds precisely with the tapered inner end of the drilled stud hole 26. In the alternative embodiment shown in FIG. 5, the insertable end of the stud 20 is flat and is positioned a short distance shy of the bottom of the hole. The studs are made of a metal having a heat transfer coefficient greater than that of the metal of the mold. In normal instances where the molds are made of gray cast iron, the studs 20 are made of a relatively pure grade of copper such as one designated by the Copper Development Association as No. 110 Electrolytic Tough Pitch Copper. Preferably a hard temper stock having a typical Rockwell Hardness test reading ranging from F—68—95 is used. The insertable end of each stud is annealed to a typical Rockwell Hardness test reading ranging suitable between F—10 and F—68 and preferably between F—10 and F—35.

The preferred method for annealing only the insertable end of the stud while leaving the protruding end 32 substantially in its originally hardened state includes heating the insertable end 30 to an annealing temperature by electrical resistance heating means 40 while firmly holding the protruding end 32 in a water cooled holder 42 incorporated in one electrode 44. The other electrode 46 has a conical depression 48 conforming precisely with the conical tip 26 of the stud 20. Each of the electrodes 42 and 48 is provided with a water inlet conduit 50 or 52 and a water outlet conduit 54 or 56, respectively. The insertable end of the stud is annealed by contacting it with the electrode 46, energizing the heating means until only the insertable end 30 of the stud 20 is brought to its annealing temperature, de-energizing the heating means, removing the partially heat treated stud from between the electrodes and allowing the stud to cool.

The relative diameters of the studs and the stud holes are sized to provide a slip fit therebetween so that the annealed insertable end 30 of the stud 20 may be manually inserted to its full depth in the hole 26. Then the insertable end may be expanded laterally or mushroomed into tight contact with the walls of the hole by one or more impacts, such as a hammer blow, on the protruding end 32 of the stud 20. In the FIG. 5 embodiment an anvil may be provided to buck against the inserted end of the stud and hold it in its desired location in the bored hole while it is being expanded by such hammer blows. The diameter of the readily deformable annealed end 30 of the stud is thereby expanded in situ into a precisely conforming tight relationship with the bored hole 26. Retention of a stud in its respective hole is further enhanced if, during the boring of the hole, circumferentially disposed grooves or tool marks 58 are produced in the walls of the hole. In such instances, the swaging action of the installation process produces circumferentially disposed ridges on the stud that correspond to these grooves or tool marks. Thus, a positive mechanical interlock is established between the stud and hole.

While illustrative embodiments of the invention have been shown and described, it is to be understood that modifications apparent to those skilled in the art may be made without necessarily departing from the scope of the appended claims.

What is claimed is:

1. A method of producing a glass mold having metal cooling studs inserted therein comprising the steps of: rough boring a series of stud receiving holes in selected regions of the mold from an outside surface inwardly to a point in close proximity to the inner surface of said mold, inserting the annealed end of a partially heat treated hard tempered metal stud into each hole, each of said studs having a diameter less than that of its respective hole and a length substantially greater than the depth of its respective hole so that the hard tempered end of said stud extends beyond the immediately adjacent mold surface, and hammering against the protruding end of each stud until the annealed end of the stud is expanded laterally into tight conforming engagement with the walls of its respective hole.

2. A metallic mold for forming glass articles comprising: separable mold sections defining at least one glass article forming cavity, said mold sections being made of a metal material having a heat transfer coefficient less than the heat transfer coefficient of copper, a plurality of stud receiving holes extending inwardly from the outer surfaces of said mold sections and a differentially heat treated copper stud installed in each of said holes, said stud having an insertable end contained in said hole and a protruding end extending beyond said hole, said insertable end being expanded in situ to a diameter that is substantially greater than the diameter of a protruding end of said stud.

3. A glass mold according to claim 2 wherein said rod is a hard temper copper rod and said insertable end is annealed to a Rockwell hardness typically ranging between F—10 and F—35.

4. A glass mold according to claim 3 wherein said copper is a hard drawn No. 110 Electrolytic Tough Pitch Copper as designated by the Copper Development Association, said insertable end has a conically tapered tip and said protruding end has a typical Rockwell hardness above F—68.

5. A glass mold according to claim 3 wherein the diameter of said stud is sized to provide a slip fit with respect to its stud receiving hole.

* * * * *